US005528303A

United States Patent [19]
Bee et al.

[11] Patent Number: 5,528,303
[45] Date of Patent: Jun. 18, 1996

[54] SYNCHRONIZING SIGNAL ACTIVE FILTER AND METHOD

[75] Inventors: Edward C. Bee, San Jose; Stephen F. Colaco, Santa Cruz, both of Calif.

[73] Assignee: Elantec, Inc., Milpitas, Calif.

[21] Appl. No.: 146,598

[22] Filed: Nov. 1, 1993

[51] Int. Cl.$^6$ .................................................. H04N 5/08
[52] U.S. Cl. ........................... 348/531; 348/532; 348/525
[58] Field of Search .......................... 348/500, 525–535, 348/540, 541, 542, 543, 545, 546, 528, 530; 328/133, 139; 333/173, 174, 175, 176; H04N 5/08, 5/010

[56] References Cited

U.S. PATENT DOCUMENTS

| | | | |
|---|---|---|---|
| 3,706,847 | 12/1972 | Smeulers | 348/532 |
| 4,237,487 | 12/1980 | Ikeda et al. | 348/530 |
| 4,468,625 | 8/1984 | Tandart et al. | 358/533 |
| 4,535,358 | 8/1985 | Duijkers | 348/542 |
| 4,698,679 | 10/1987 | Balaban et al. | 348/532 |

FOREIGN PATENT DOCUMENTS

| | | | |
|---|---|---|---|
| 0330006 | 8/1989 | European Pat. Off. | H04N 5/08 |
| 2189108 | 10/1987 | United Kingdom | H04N 5/08 |

*Primary Examiner*—Safet Metjahic
*Assistant Examiner*—Michael H. Lee
*Attorney, Agent, or Firm*—Albert C. Smith

[57] ABSTRACT

An integrated active filter and sync separator circuit operates on precision internal reference sources to set the filter cut off frequency as a function of resistance of an external resistor. The active filter eliminates the source of sync tip crushing attributable to conventional clamping circuits associated with sync pulse detectors, and also provides sync pulses substantially devoid of time-variant jitter.

4 Claims, 7 Drawing Sheets

SYNCHRONIZING SIGNAL ACTIVE FILTER AND METHOD

FIELD OF THE INVENTION

This relates to active filters and more particularly to circuitry and method for filtering video signals prior to extraction of synchronizing signals within the composite video signal.

BACKGROUND OF THE INVENTION

Certain known video signal processing circuits commonly rely upon passive filters to remove the chroma burst in a composite television video signal prior to detecting the synchronization pulse. Such filters commonly require passive components in R-C or L-C filter circuits that can be optimized for specific applications at specific scan rates by changing component values as desired. However, such conventional passive filtering schemes commonly include resistance in series with an input coupling capacitor which causes 'sync tip crushing', or reduction of the sync tip amplitude available for sampling. In addition, these conventional filtering schemes are not conveniently variable for optimizing performance and may require accessible circuit board space for interconnection of removable components.

SUMMARY OF THE INVENTION

In accordance with the present invention, an active, tracking filter is integrated within a sync separator circuit chip to provide tracking of the sync separator timing and filter cut-off frequency for varying scan rates. The filter characteristics are programmable via an external resistor, or are programmable in response to digital control signals via a digital-to-analog converter.

DESCRIPTION OF THE PREFERRED EMBODIMENT

Figure 1:
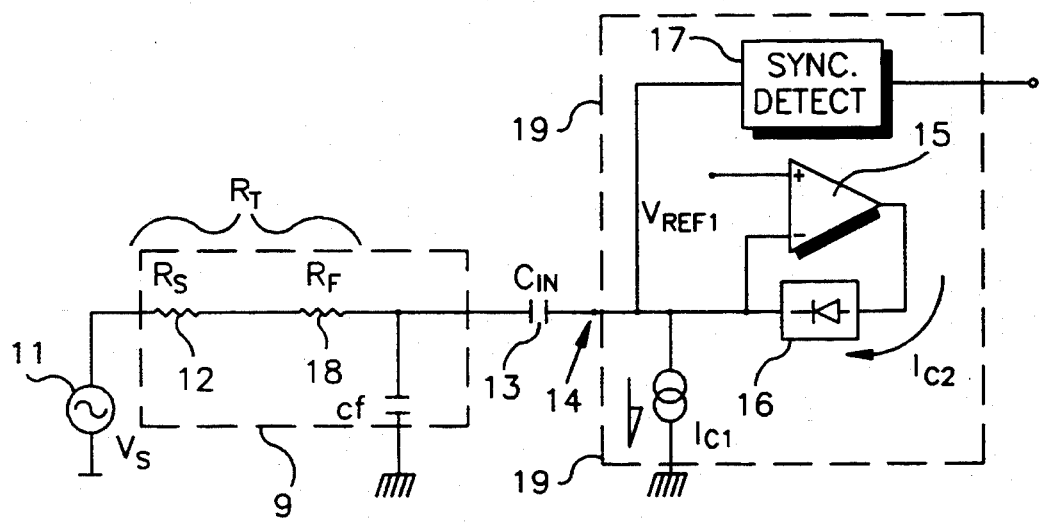
FIG. 1 is a simplified block diagram of a conventional filtering and clamping scheme for synchronizing pulses.
Figure 2:
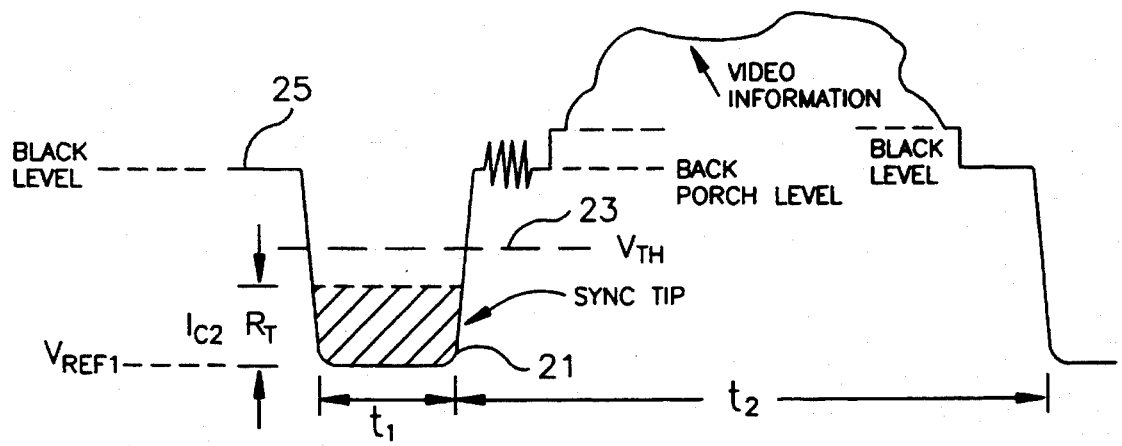
FIG. 2 is a graph illustrating a scan line of a television video signal.

Referring now to FIG. 1, there is shown a conventional filtering scheme in which video signal 11 passes through a passive filter 9 and through coupling capacitor 13 to a clamp circuit 15 and sync-pulse detector 17 that are fabricated into an integrated circuit 19. In this configuration, the clamp 15 limits the most negative level of the sync pulse in the video signal 11. The filter 9 typically requires external components and separate mounting space on a circuit board and is not conveniently adjustable to optimize circuit performance, for example, at varying scan rates. Conventional circuitry of this type also commonly reduces the amplitude of the sync tip 21, as illustrated in FIG. 2, due to some equivalent resistance $(R_T)$ in filter 9 being serially connected with coupling capacitor 13 to the integrated circuitry 19. Specifically, the input signal at 14 on the output side of the coupling capacitor $C_{IN}$ (13) will not be less than voltage $V_{REF1}$ (i.e. the clamp level) because the low impedance created by the operational amplifier 15 and feedback network 16. Above level $V_{REF1}$, point 14 will exhibit high impedance because the operational amplifier 15 and feedback network 16 are designed to provide the same action as a diode in the feedback network 16. For example, the circuit can supply a high value of current in one direction and a low value of current in the opposite direction.

In a typical video application, the sync tip 21, as shown in FIG. 2, has a much shorter duration, $t_1$, than the remainder of the line scan, $t_2$, which contains the scan line of video picture information. During time $t_2$, a current source Ic1 charges the coupling capacitor 13 and the voltage across the capacitor 13 will increase by an amount $\Delta V = I_{c_i} t_2 / C_{in}$.

The charge removed from the capacitor during time $t_2$ must be replaced during time t1 by current $IC_2$ from the low-impedance clamp circuitry. For exact charge cancellation, $$I_{C2}/I_{C1} = t_2/t_1 \qquad \text{(Eq. 1)}$$

It can be seen that typically $IC_2$ will be an order of magnitude greater than $IC_1$. The current path of $IC_2$ will be through resistor 12 as the source impedance of signal source 11, and the resistor 18 as the filter impedance. If the total impedance of the filter (RS+RF) is RT, then the sync pulse amplitude will be reduced by $I_{C2}$.RT, as illustrated in FIG. 2. It can be seen that the 50 % threshold point 23 of the sync pulse, VTH (which is conventionally measured and used for detection of the sync pulse edges) will now move toward the black level 25 and increased probability of detection error. The use of an active filter avoids this problem by eliminating the filter (RF) equivalent resistance in the signal path.

Figure 3:
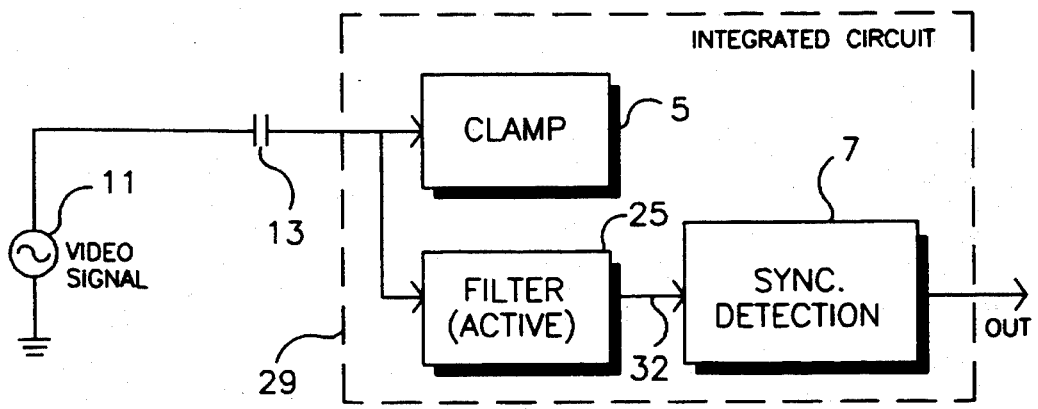
FIG. 3 is a simplified block schematic diagram of the circuit of the present invention.

In accordance with the illustrated embodiment of FIG. 3, the present invention configures a clamp circuit 5, an active filter circuit 25, and a sync pulse detector 7 into integrated circuit 29. In this configuration, the filtering takes place after the sync tip has been clamped, and improved performance is provided by the active filter 25 which tracks the sync pulse timing and filter cut-off frequency for varying scan rates, as described below. In this circuit configuration, sync tip 'crushing', as described above, is avoided.

Figure 4:
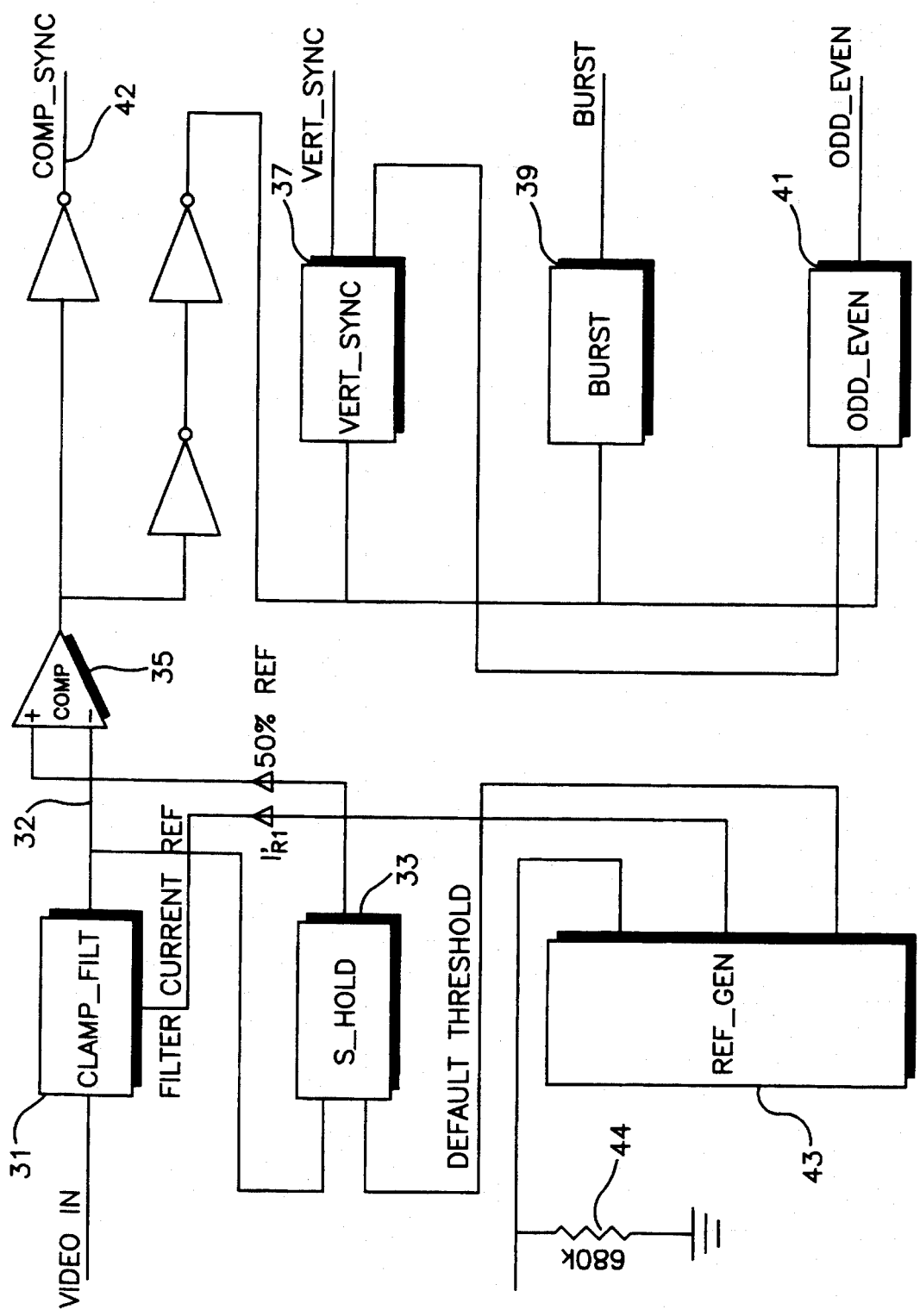
FIG. 4 is a block schematic diagram of a sync separator circuit according to the present invention.
Figure 5:
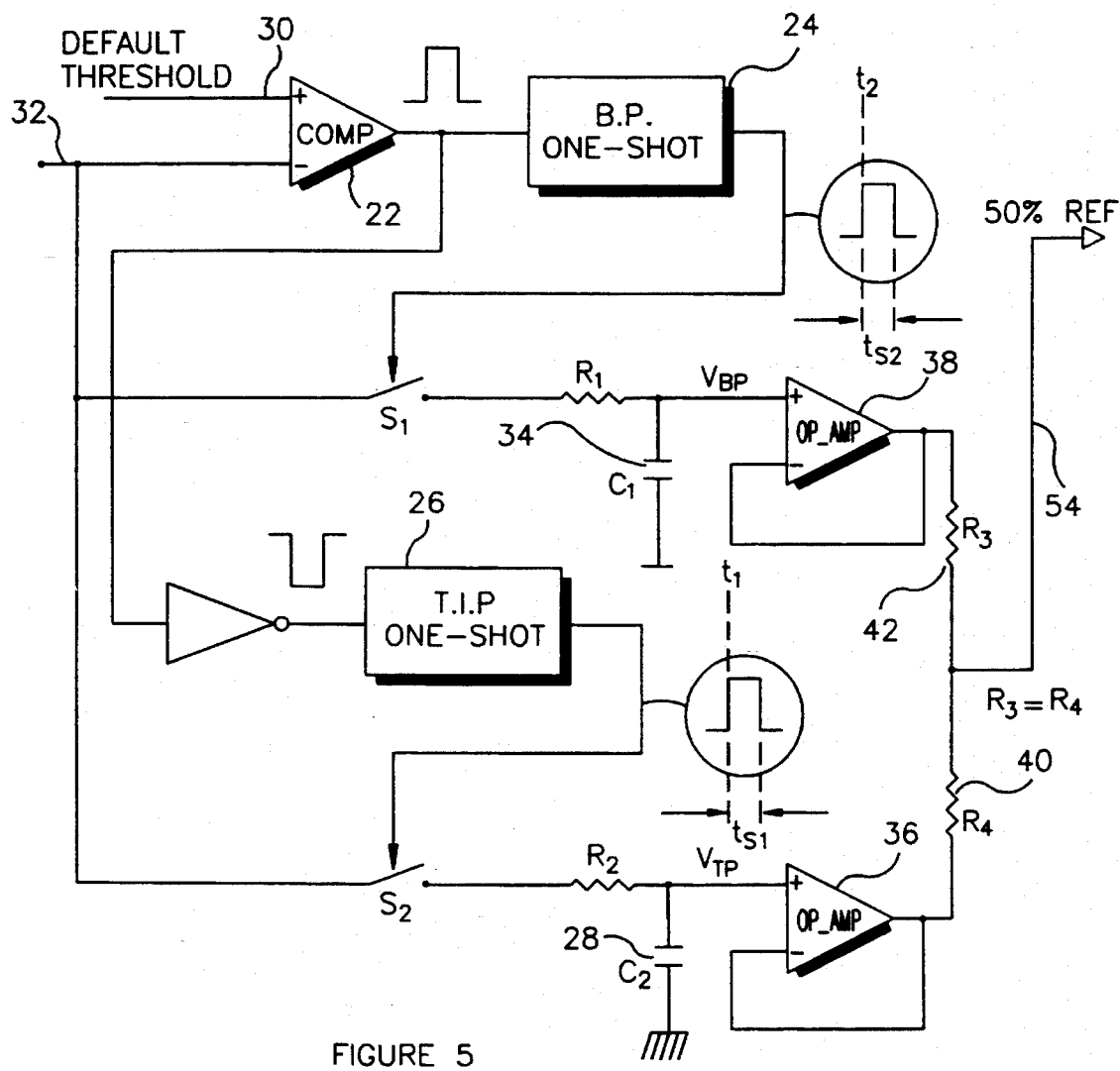
FIG. 5 is a schematic diagram of the sample and hold circuit in FIG. 4.
Figure 6:
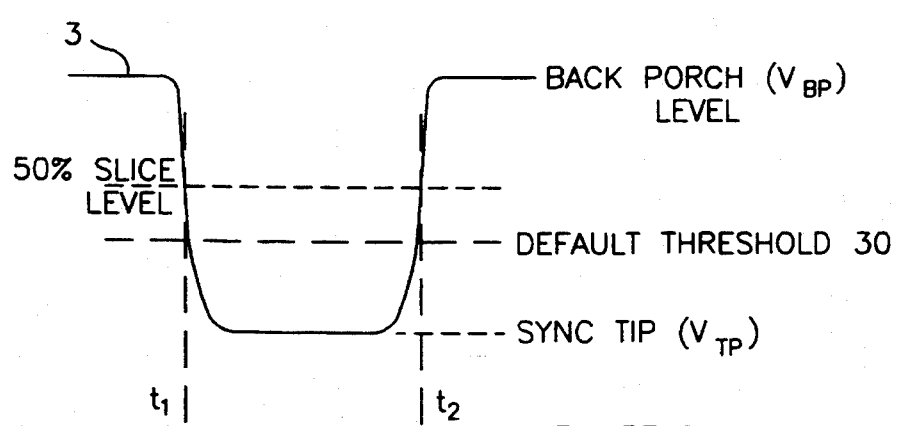
FIG. 6 is a graph showing the timing and amplitude conditions of a sync pulse.

Referring now to FIG. 4 and FIG. 6, there are shown a block schematic diagram of the circuitry in the integrated circuit 29, and a plot of the sync pulse with time in a composite television signal. Specifically, the circuit includes a DC clamp and a filter 31, a sample and hold circuit 33 for establishing a precise threshold for 50% sync 'stripping', a precision comparator 35, timers for vertical sync 37 and burst outputs 39, and the logic circuitry 41 for detecting odd and even interlaced fields of video information. The sample and hold circuit 33 is shown in detail in FIG. 5. The comparator 22 is connected to receive the signal 32 from the filter 25 in FIG. 3 to produce a trigger output in response to the input signal 3 crossing the voltage default threshold 30 which is set at a fixed level above the clamp voltage VREF1 previously described. The comparator 22 is connected to trigger the one-shot circuits 24, 26 and thus turn on the switches $S_1$ and $S_2$ for fixed sampling times. By selectively delaying the sampling of the applied signal 32 via switch $S_2$, the sync tip voltage level $V_{TP}$ may be established independently of transients and color burst.

The tip one-shot 26 is triggered on at time $t_1$ so that $S_2$ is closed at time $t_1$ for a time $t_{S1}$ so that the value of the sync tip voltage (VTP) is stored on capacitor 28 ($C_2$).

Similarly, switch $S_1$ is closed at time $t_2$ to store the value of the "back porch" voltage (VBP) on capacitor 34 ($C_1$). Switches $S_1$ and $S_2$ may comprise conventional CMOS transistors. The stored values of $V_{Tp}$ and $V_{Bp}$ on capacitors 28 and 34, respectively, are buffered by the respective operational amplifiers 36, 38. The value of $(V_{Bp}+V_{Tp})/2$ is then provided as the 50% reference voltage on line 54 by the divider of equal-value resistors 40 and 42 connected to the outputs of amplifiers 36 and 38, which 50% reference voltage is then applied to the input of the comparator 35 shown in FIG. 4. Thus, the reference comparator 35 switches at precisely the mid-point of the sync pulse to provide more precise, predictable timing, as shown in the graph of FIG. 6. The output of the comparator 35 comprises a series of pulses between 0 volts and supply voltage, and, thus is digital in nature with high and low logic levels, and these pulses correspond to the sync pulses on the original video signal input, but with the video and color burst separated or stripped off. Thus, the output from comparator 35 corresponds to composite sync 42 and the tasks of the remaining circuits including vertical sync 37, burst 39, and odd-even field selection 41 are simply to separate out the different pulses associated with composite video signals using conventional or standard circuit techniques.

Figure 8:
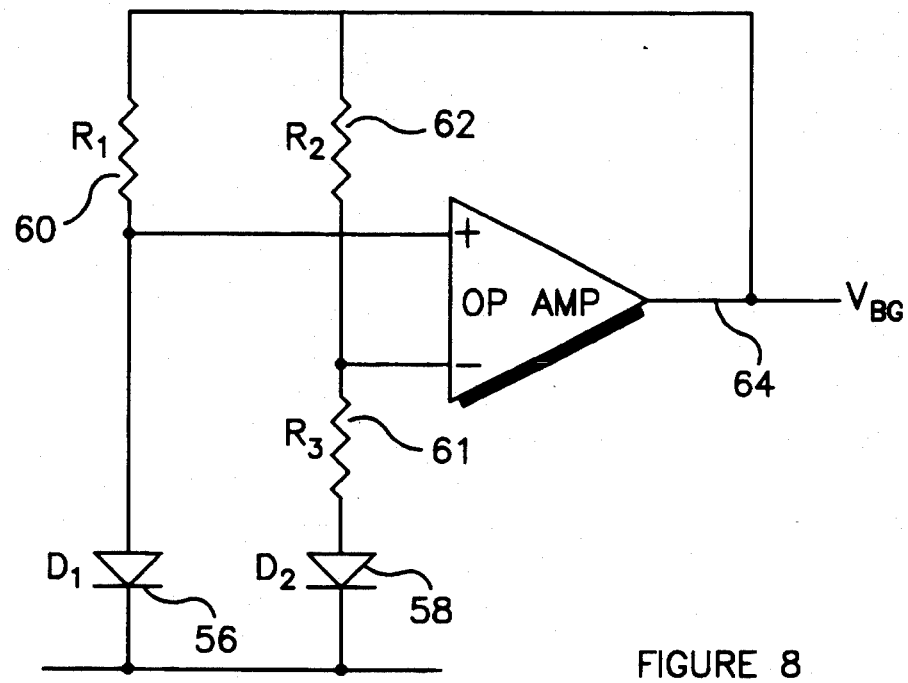
FIG. 8 is a schematic diagram of a reference voltage generator.
Figure 9:
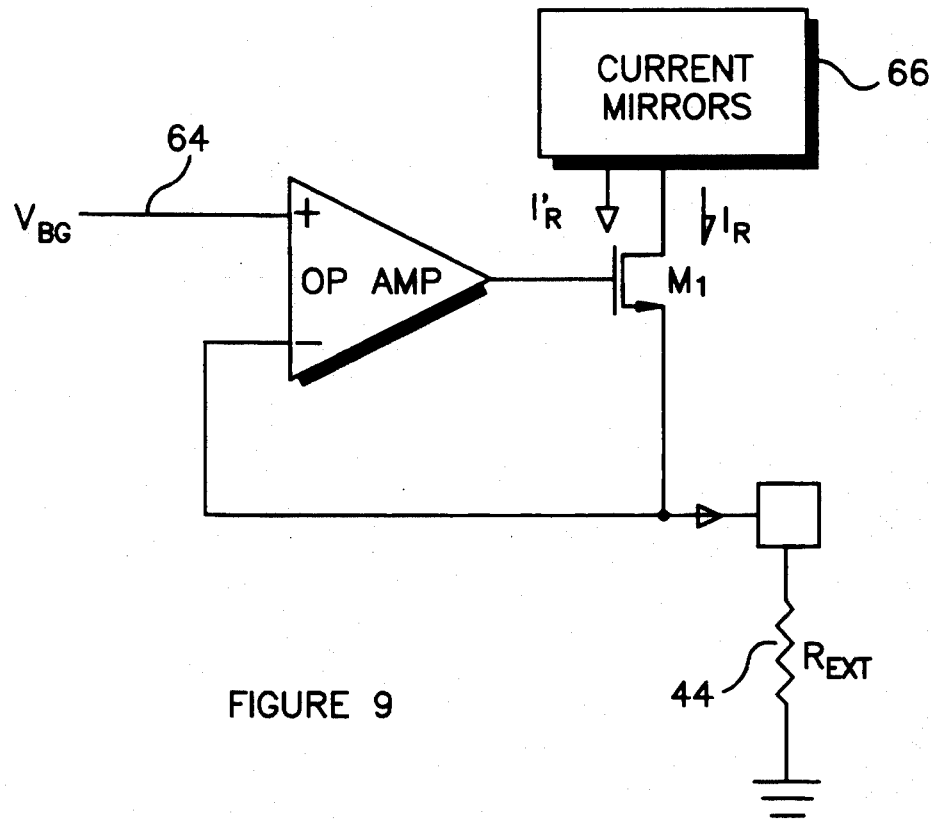
FIG. 9 is a schematic diagram of a reference current generator.

The reference generator 43 in the circuit of FIG. 4 includes a bandgap reference circuit as shown in pertinent portion in FIG. 8, and also includes the reference generator circuitry, for example, as illustrated in FIG. 9. The reference generator also includes bias generators for all timing circuits, and a bias generator for defining a precision current determined by an internal bias voltage and the external resistor 44. Specifically, the bandgap reference is fundamentally a temperature-independent reference voltage that is derived from a forward-biased diode 56 (which has a negative temperature coefficient) and a forward-biased diode 58 (which has a different negative temperature coefficient) which has typically three times larger anode and cathode area relative to the anode and cathode area of diode 56. Thus, by appropriate ratio of the diode sizes and of the resistors 60, 62 to establish greater current in the smaller diode 56, a well-defined reference voltage $V_{BG}$ 64 can be provided with predictable temperature coefficient characteristics (i.e., positive, zero or negative). This reference voltage $V_{BG}$ provides a reference current $I_R$ within the integrated circuit 29 via a conversion circuit, as shown in FIG. 9, that supplies the reference current $I_R$ derived from the external resistor $R_{EXT}$ 44 as:

$$I_R = \frac{V_{BG}}{R_{EXT}} \qquad \text{(Eq. 2)}$$

Thus, conventional current mirror circuits 66 can replicate the reference current $I_R$ within the integrated circuit to provide the reference current $I_R'$ for the filter circuit 31. The same $R_{EXT}$ 44 can thus be used for such other purposes as setting the internal timing periods of the vertical sync generator 37 and the burst circuit 39 as well as for setting the cut-off frequency of the filter 31. Thus, as $R_{EXT}$ 44 is changed for shorter time periods corresponding to faster scan rates, the filter cut-off frequency will track the change in scan rates since both are controlled by the same resistor 44.

Since the same bias generator is used for providing reference voltages for the timing circuits, the time delays generated are a function of the external resistance 44 alone (and the internal capacitance elements within the components of the integrated circuit 29), and such delays are independent of supply voltage, temperature and device threshold voltages.

Figure 7:
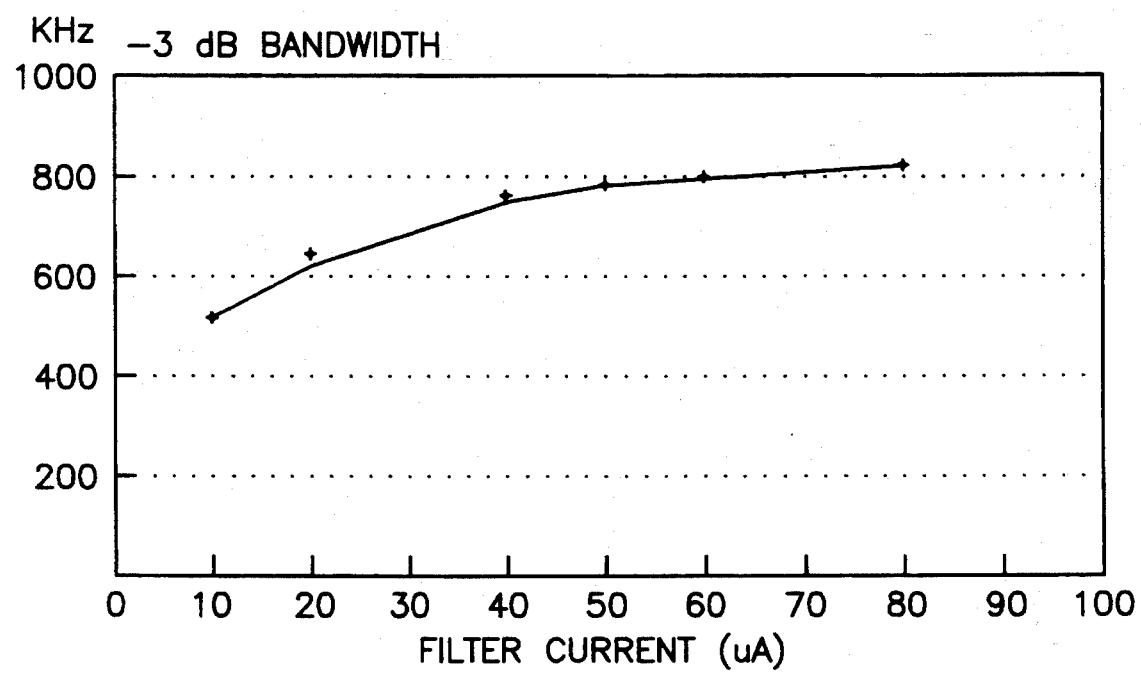
FIG. 7 is a graph illustrating the programmable characteristics of the filter circuit of the present invention.

The graph of FIG. 7 shows the variation of cutoff frequency with reference current. Since the primary function of the external resistor 44 is to set the reference current which, in turn, defines the required timing functions for different scan rates, it can be seen that the cutoff frequency of the filter is automatically controlled by the same external resistor 44 to track the appropriate scan rates.

Figure 10:
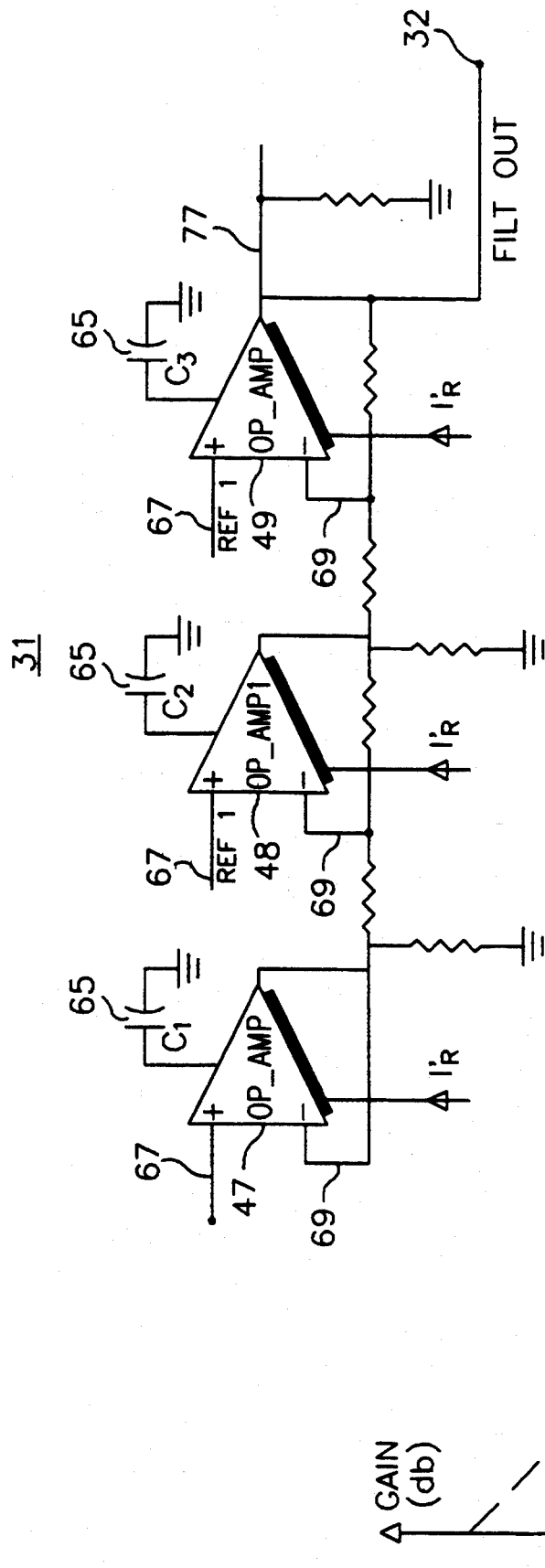
FIG. 10 is a schematic diagram of the filter circuit of the present invention.
Figure 11:
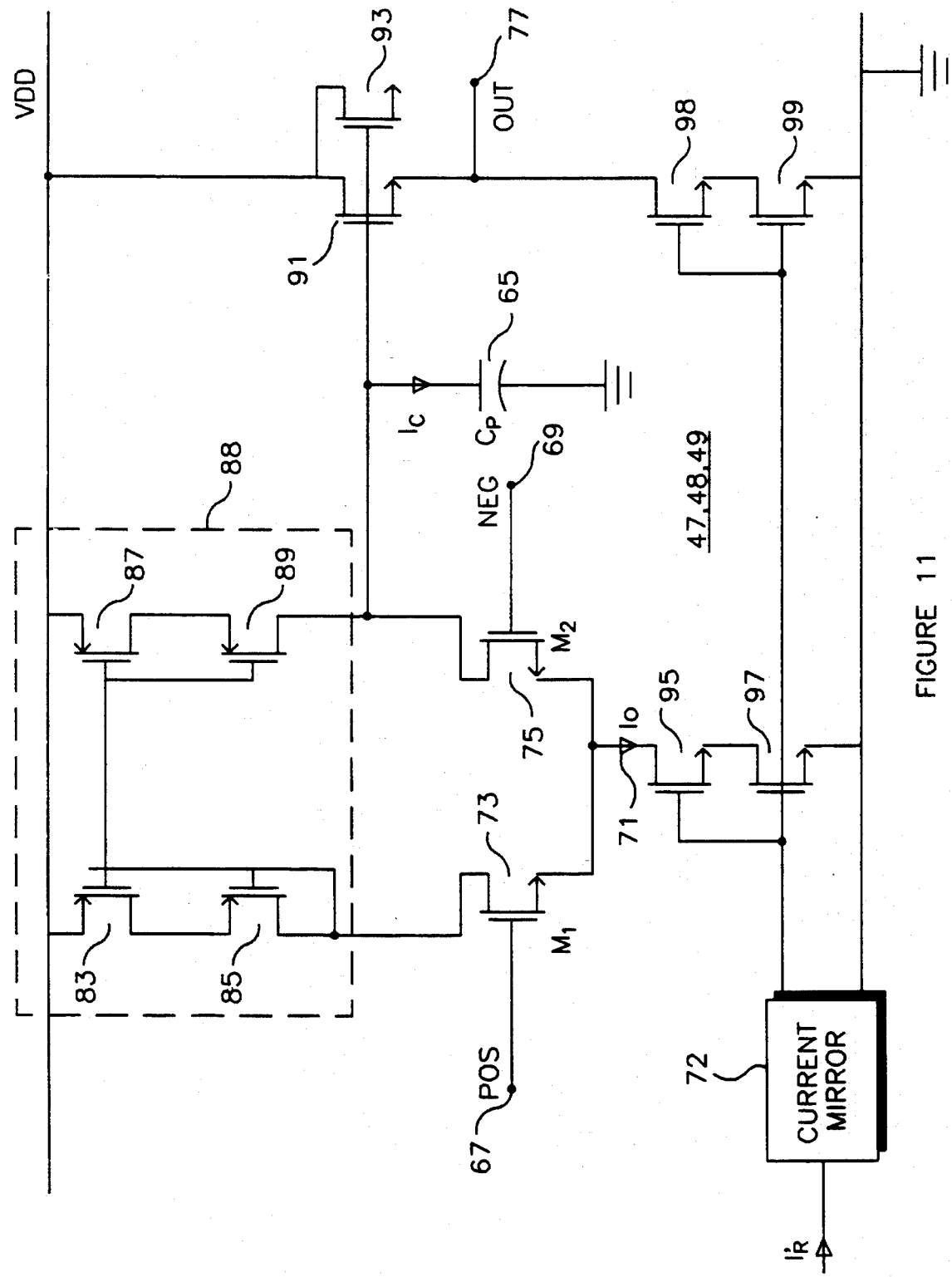
FIG. 11 is a schematic diagram of an amplifier for operation in the filter circuit of FIG. 10.

Referring now to FIG. 10, there is shown a circuit diagram of the filter including a 3-pole, low-pass linear phase response filter 47,48,49. Each dominant pole is provided in each stage 47, 48, 49 by capacitance 65 attached to the inverting output of a long tailed pair of N-Channel devices, as shown in the circuit of FIG. 11. Specifically, with reference to FIG. 11, the signal current $i_c$ into the capacitor 65 is a function of the applied voltage across the positive and negative input terminals 67, 69, and the bias current $I_o$ 71, and the geometries of the transistors 73 ($M_1$) and 75 ($M_2$), according to the ratio:

$$Ic = gm\, Vs \qquad \text{(Eq. 3)}$$

where $$gm = [\mu p\, Cox\, W/L\, Io]^{1/2} \qquad \text{(Eq. 4)}$$

where

W=gate width of M1, M2

L=gate length of M1, M2

µp=electron mobility in silicon

Cox= oxide capacitance per unit area of the gates of M1, M2

Io=current proportional to $I_R'$

The voltage on the output 77 thus follows the voltage across capacitor 65 so that the frequency response and the gain of the operational amplifies 47–49 with frequency will be determined by the capacitor and gm.

Because current Io (71) is the only variable controlling Gm (where the other parameters are fixed when the integrated circuit is fabricated), it can be seen that the frequency response of the amplifiers are controlled by the current Io. The values of W/L and capacitance may be chosen when fabricating the integrated circuit 29 to provide a selected value of cut off frequency for a specific value of Io, and the unity gain—bandwidth is given by:

$$F = gm/2\pi. \qquad \text{(Eq. 5)}$$

where C is the total effective capacitance and gm is the effective transconductance of the transistors M1 and M2.

Thus, the filter structure of FIG. 10 includes three cascaded transconductor-capacitor sections 47–49 optimized to provide the required dynamic range and attenuation while maintaining a constant group delay under control of current Io which is controlled externally in response to the applied bias signal.

Figure 12:
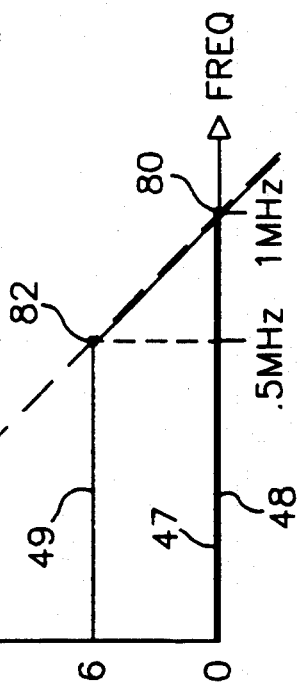
FIG. 12 is a graph illustrating preferred filter response.

Ideally, a Bessel or equiripple linear phase characteristic would be the most appropriate response. The desired filter characteristics can be determined by selecting the appropriate capacitor values 65 in each stage ($C_1$, $C_2$, $C_3$), as shown in FIG. 10, and by selecting the bias current Io, as shown in FIG. 11, and by establishing the area and geometries of the transistors 73,75 ($M_1$,$M_2$) in FIG. 11 during fabrication of the circuit chip. Of course, the desired response characteristics of the active filter 31 in FIG. 4 can be determined by selecting the number of amplifier-capacitor combinations as independent stages included in the filter circuit, for example, as_ illustrated in FIG. 11. A current mirror 88 is formed of transistors 83, 85, 87 and 89, and current sources are formed of transistors 95, 97 and 98, 99. The parallel-connected transistors 91 and 93 form a source follower for low impedance output. Continuous-time techniques (c.e., non-sampling schemes) should be used to perform the required filter function directly without sampling the input signal. Specifically, with reference to the graph of FIG. 12, there is shown an idealized plot of the gain and frequency response of the active filter stages on applied signal 67. This graph illustrates that each of the first two stages 47, 48, have approximately the same gain and break-point frequencies 80 (set at about the same frequency in the range from about 800 kilohertz to about 1 megahertz), and that the last stage 49 has twice the gain of any of the first two stages, and a break-point frequency 82 set at about one half the break-point frequency (or about 400–500 kilohertz) of any of the first two stages. The overall gain and frequency response and phase delay of the active filter thus configured provides reduced ripple in the output 32 with substantially constant phase delay through the filter to assure that the sync pulses do not exhibit time jitter with variations in amplitude, and to assure that the delay through the filter is substantially constant.

Therefore, the fully integrated filter and sync separator of the present invention provides precise sync pulse separation that can be programmed via an external resistor for operation at a variety of scan rates, at low cost and in a small physical size of integrated circuitry. In addition, the active filter of the present invention is not affected by the chroma burst of composite television signals, and is thermally stabilized against variations in performance to provide substantially jitter-free sync pulses that are not crushed or diminished in amplitude by the clamping circuitry.

We claim:

1. An active filter circuit for processing composite analog television signals including a horizontal synchronizing pulse, the active filter circuit being coupled to receive the horizontal synchronizing pulse and comprising:

a plurality of signal stages sequentially coupled to receive the applied composite analog television signal, and including in each stage a gain element and a capacitor for establishing a pole of frequency response at a selected operating frequency, the gain element in at least one of said signal stages having a gain proportional to an applied control signal, and the gain element in one of the signal stages having a gain greater than the gain of a gain element in another of the signal stages for providing a plurality of poles of frequency response through the sequentially coupled signal stages that are variable in response to the applied control signal;

a reference source coupled to said at least one gain element for applying said control signal thereto;

first circuit means coupled to receive the filtered composite analog television signal for producing a first output signal representative of the peak amplitude of the horizontal synchronizing pulse, and for producing a second output signal representative of a reference signal level of the horizontal synchronizing pulse;

second circuit means coupled to receive the first and second output signals for producing a reference signal therefrom representative of a logical combination of the amplitudes of the first and second output signals; and logic means coupled to receive the reference signal and the filtered composite analog television signal for producing a logic output signal having a high logic state and a low logic state indicative of transitions in the amplitude of the horizontal synchronizing pulse relative to the amplitude of the reference signal, the logic output signal simulating synchronizing pulses with amplitudes proportional to said high and low logic states.

2. The filter circuit according to claim 1 comprising at least three signal stages in which two of the poles of frequency response are established at frequencies in the range frequency in the range from about 0.4 to about 0.5 megahertz and approximately 6 dB gain for establishing a selected overall phase relationship from an input of a first one of the signal stages to an output of a last one of the signal stages for composite analog video signal applied thereto.

3. A circuit for providing synchronizing signals from a composite analog video signal including video information and horizontal synchronizing pulses, the circuit comprising:

filter means coupled to receive the composite analog video signal and having a frequency response characteristic on applied signals that is determined by an applied control signal, a reference source coupled to the filter means for applying the control signal thereto to determine the frequency response characteristics of the filter means;

a control circuit coupled to receive the filtered composite analog video signal for producing a reference signal representative of selected signal parameters of the horizontal synchronizing pulse; and logic means coupled to the filter means for producing logic output signals having high and low logic operating levels in response to transitions in the amplitude of the horizontal synchronizing pulse relative to the level of said reference signal.

4. A method of retrieving horizontal synchronizing signals from applied analog composite television signals including video information and horizontal synchronizing pulses, comprising the steps of:

filtering the analog composite television signals relative to a selected frequency response which is determined by a control signal;

producing the control signal;

producing a reference signal from the filtered analog composite television signal representative of selected signal parameters of the horizontal synchronizing pulse; and producing logic output signals having high and low logic operating levels in response to transitions in the amplitude of the horizontal synchronizing pulse relative to the level of the reference signal.

* * * * *